United States Patent [19]

Vacon et al.

[11] Patent Number: 5,227,778
[45] Date of Patent: Jul. 13, 1993

[54] SERVICE NAME TO NETWORK ADDRESS TRANSLATION IN COMMUNICATIONS NETWORK

[75] Inventors: Gary V. Vacon, Melrose; John A. Visser, Wakefield, both of Mass.

[73] Assignee: Digital Equipment Corporation, Maynard, Mass.

[21] Appl. No.: 681,552

[22] Filed: Apr. 5, 1991

[51] Int. Cl.⁵ .............................................. H04B 1/00
[52] U.S. Cl. .............................. 340/825.52; 370/85.1; 370/94.1
[58] Field of Search ...................... 340/325.52, 825.06, 340/825.07, 825.08; 370/85.1, 85.5, 85.8, 85.9, 85.11, 92, 93, 94.1

[56] References Cited

U.S. PATENT DOCUMENTS

| | | | |
|---|---|---|---|
| 3,643,030 | 2/1972 | Sparrendahl. | |
| 4,707,828 | 11/1987 | Yamada | 370/85 |
| 4,713,805 | 12/1987 | Hénaff | 370/85 |
| 4,818,984 | 4/1989 | Chang et al. | 340/825.54 |
| 4,823,122 | 4/1989 | Mann et al. | 340/825.28 |
| 4,959,015 | 7/1988 | Takai et al. | 370/86 |
| 5,025,491 | 1/1991 | Tsuchiya et al. | 340/825.52 |

Primary Examiner—Donald J. Yusko
Assistant Examiner—Dervis Magistre
Attorney, Agent, or Firm—Arnold, White & Durkee

[57] ABSTRACT

A data communications network having a number of servers and a number of service providers employs an improved protocol for translating service names to network addresses. A server sends a multi-cast message to all service providers requesting a service needed by one of the user terminals connected to this server. In the request, the service is identified by function, rather than by address. Any node which provides this service, receiving the request and able to reply, sends a reply message immediately to the server. The reply message identifies the node (service provider) by network address, so a transaction with this provider can be initiated by the server immediately. If the service provider cannot reply, a third party node can send a reply to identify the provider by address. If the server does not receive a reply from either the provider or a third party, then a cache of network addresses of services most recently used by the server is searched for this particular service. The cache may include a separate local cache for each user terminal connected to this server, with each local cache containing the service and address for the last-used service for one of the user terminals. In addition, a secondary cache is maintained for all items replaced in the local caches when they are updated. When the cache is searched (both local and secondary), if the service address is found, a transaction is begun immediately by the server to utilize the service. If not found in the cache, the server waits for a service advertisement to appear on the network, and obtains the network address of the provider from the advertisement.

34 Claims, 4 Drawing Sheets

SERVICE NAME TO NETWORK ADDRESS TRANSLATION IN COMMUNICATIONS NETWORK

BACKGROUND OF THE INVENTION

This invention relates to data communications systems, and more particularly to methods of translating service names to network addresses of service providers in a local area transport protocol used in a communications network.

In U.S. Pat. No. 4,823,122, issued Apr. 28, 1989, assigned to Digital Equipment Corporation, assignee of this invention, a local area network is disclosed which is capable of interconnecting terminals with service providers using a communications link. The terminals are coupled to the link by interface units called servers which handle network protocol functions for the terminals. One of the functions provided by the servers is that of translating service names to network addresses. The terminals send requests to the servers for network services using the name (function) of the service rather than the address of the service provider. To perform the translation operation, the server may accumulate service advertisements periodically sent by the service providers, generating a service directory. When the server then receives a request from one of its terminals, the service directory is searched to find the service name and its corresponding network address of the provider of this service. Storage of the service directory places a burden on the server in large networks in that a large amount of memory must be provided. To reduce the memory requirements at the server, the service providers can be assigned group codes, and the server can then store only the service advertisements for its assigned group codes. The maintenance of the group codes imposes an additional burden, however, since user intervention is required to select the groups of providers, and to select the group codes to be copied by each of the users. The group codes must be carefully configured to avoid using excess memory space in the servers, but yet make sure each type of user has information available for each service it may ever need to use. To reconfigure the system when changes are made, the manager of the service providers (usually systems manager), and the network manager, must agree on group codes, then each one must set up the changes on the system and the servers. That is, due to the requirement for establishing and setting up group codes, a new user terminal cannot be merely plugged into the system and used immediately because the terminal must be assigned group codes consistent with its server or else the server must be reconfigured.

SUMMARY OF THE INVENTION

In accordance with one embodiment of the invention, improved methods are provided for translating service names to network addresses in a data communications network which has a number of servers and a number of service providers. Each server has a number of user terminals connected to it, and at any time the terminals may seek to access various services provided by the network. These services will be requested by name, rather than by network address. Instead of maintaining a local directory in the server of all services and the network addresses of the providers, an improved protocol in implemented according to the invention.

First, a server sends onto the network a multi-cast message to all service providers requesting a service needed by one of the server's user terminals. In the multi-cast request message, the service is identified by function, rather than by network address. Any node on the network which is a provider of the requested service, and able to reply upon receiving the multi-cast request, sends a reply message to the server. This reply message identifies the replying node by network address, so a transaction with this provider can be initiated by the server immediately. In an alternative embodiment, if the service provider cannot itself reply (e.g., due to being busy), a third party node can send a reply to the server to identify the provider by address. Thus, in most cases, the transaction for using the service begins after the multi-cast message and its reply.

The second level of the protocol makes use of a cache of network addresses of recently-used services. If the server does not receive a reply from either the provider or a third party, then a cache of network addresses of services most recently used by the server is searched for this particular service. The cache may include a separate local cache for each user terminal connected to this server, where each local cache contains the service and address for the last-used service for one of the user terminals; in addition, a secondary cache is maintained for all items replaced in all of the separate local caches when they are updated. When the cache is searched, if the service address is found, a transaction is begun immediately. Frequently used services, such as network printers or the like, are thus almost always immediately identified from the cache, if not identified as a result of the multi-cast request message.

The third level of the protocol employs the service advertisements as sent periodically by service providers. If the service provider is not found in the cache, the server waits for a selected period for a service advertisement to appear on the network, and obtains the network address of the provider from the advertisement. The entire content of the service advertisement is not locally stored, however, and so memory requirements for the server are not burdened by the address translation function. Instead, only the immediately-needed address is used, and the remainder of the service advertisements are discarded by the server.

Use of the improved protocol of the invention avoids the need for configuring elaborate group codes and other such higher level identification of services and users, as has been done in previous systems employing transport protocols as discussed above. All services are accessible by any server, independent of assignment of group codes; some servers on a network can be implementing the protocol of U.S. Pat. No. 4,823,122 using group codes, and other servers can be using the protocol according to this invention.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENTS

Figure 1:
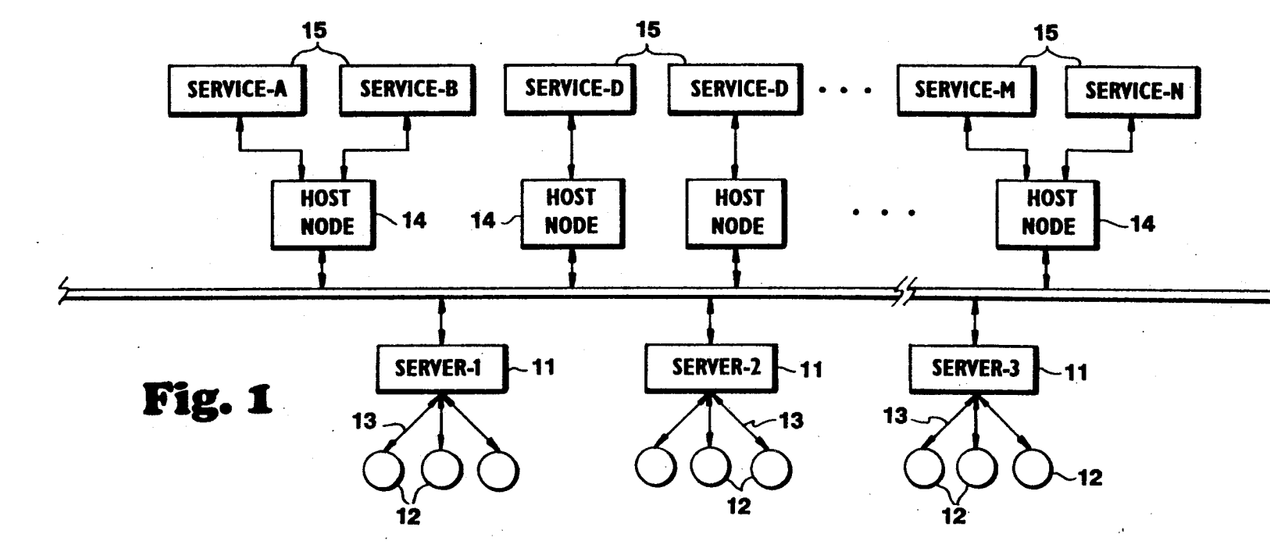
FIG. 1 is an electrical diagram in block form of a data communication system which may use features of the invention.

Referring to FIG. 1, a communications network is illustrated which may use features of the invention. This network includes a communications link 10, and a number of servers 11 coupled to the communications link, with a number of user terminals 12 coupled to each server 11. The user terminals 12 may be personal computers, modems connected to remote users, video display terminals, point-of-sale terminals, automated teller machines, or any of a variety of such devices. The links 13 between user terminals 12 and the servers 11 may be local area networks using technologies such as Ethernet, token ring, StarLan, or the like, or may be merely RS232 type connections. Service providers are also coupled to the communications link 10 and usually take the form of host computers 14, each of which is shown to provide one or more services 15, identified as service-A, service-B, etc. These services may be, for example, bulk storage using disk or tape, satellite or microwave links to remote locations, global database utilities, high-speed printers, or various other facilities (hardware or software resources) that are to be made available to the user terminals 12 via the servers 11 and the network 10.

The physical construction of the communications link 10 can be of various types, such as coaxial cable, twisted pair, fiber optics, or the like. The communication method and protocol employed can also be of various types, such as DECnet, Ethernet, token ring, or FDDI, for example. While these commonly-used communications methods are based on bit-serial transmission on the link 10, the features of the invention are applicable as well to communications methods using parallel data transmission on the link. Of course, the communications link 10 may include bulk transfer facilities (trunk lines) using multiplexing, such as T1 circuits or the like. Or, a bulk transfer facility may be one of the services represented by the services 15. The communications network represented in FIG. 1 may service hundreds or thousands of user terminals 12, depending upon the installation. Each server 11 may have dozens of user terminals 12 connected to it, and there may be a large number of servers 11. The network of FIG. 1 may be connected to other such networks by bridges, either represented by services 15 or otherwise (i.e., transparent to the protocol), and so the number of users and the number of service providers can be quite large.

The communications network illustrated in FIG. 1, in a preferred embodiment, is generally of the type disclosed in the above-mentioned U.S. Pat. No. 4,823,122, which is incorporated herein by reference, and executes a local area transport (LAT) protocol. The communications protocol described in the patent may make use of virtual circuits to define a two-way path between a particular server 11 and a particular node or host computer 14.

Figure 2:
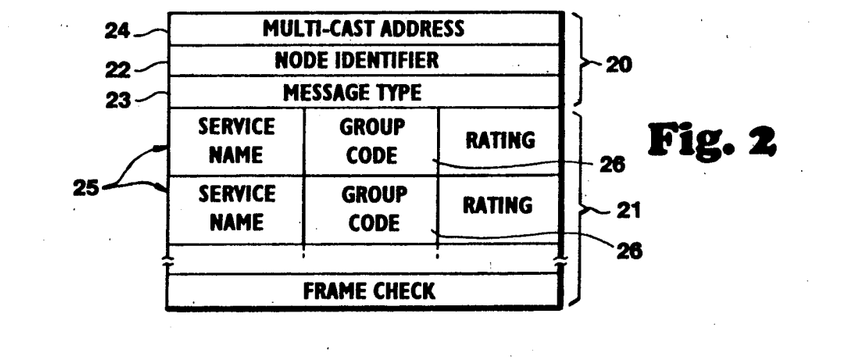
FIG. 2 is a diagram of one embodiment of a message format for a service advertisement which may be used in the system of FIG. 1.

A feature of the protocol used in the communications network described in the U.S. Pat. No. 4,823,122 is the use of advertising messages sent periodically by the service providers to advise all servers of what services are available on the network. To this end, a service advertising message as seen in FIG. 2 is sent periodically by each host 14, by which it identifies itself (by network address) and the service or services provided at its node. The service advertising message has a number of fields including a header 20, the content of which depends upon the protocol used over the communications link 10 in the network. The header 20 is followed by a body 21 in the message of FIG. 2. The header 20, in a typical embodiment, includes a node identifier field 22 identifying the transmitting node (one of the host computers 14, for example), and a type field 23 identifying this message as a service advertising message. A multi-cast address field 24 enables all of the servers 11 to receive the message. In the body 21 of the message each of the one or more services provided at this node is identified and the rating (delay) for this service is specified, in one or more fields 25. The rating field is generated by the host node 14 itself and is dependent upon the present traffic in requests from other users directed to this node for the service in question, expressed, for example, in time delay or available bandwidth for another user who might request the service. The service advertising messages of FIG. 2 are sent at regular intervals by each of the host nodes 14; for example, these messages may be sent at 30-second intervals by each node which is providing a service.

In the communications network of U.S. Pat. No. 4,823,122, each server accumulates the data received in the service advertising messages of FIG. 2 in order to establish a local "service directory" as is illustrated in FIG. 2B of such patent. The service directory comprises a table containing identifications, name of service provided, and service ratings, as sent by the host nodes 14 in the advertising messages. This table is stored in the local memory of the server 11. When a user terminal 12 (or the server 11 itself) requires a service, the server employs the service directory to determine which nodes provide the service at the optimum service rating. A message is then sent to the selected host node to initiate establishment of a virtual circuit for the service transaction, or otherwise a transaction is begun for sending data to the selected host and receiving data from the host.

In order to reduce the storage requirement at the servers 11, instead of storing all of the data received in the service advertising messages of FIG. 2, it has previously been the practice to divide the service providers into groups or classes, with the object being to determine in advance what types of service will be used by (or available to) a given type of user terminal 12 present at a server 11. This group code is another field 26 added to the service field 25 of the advertising message of FIG. 2. In FIG. 1, for example, service-A, service-B and service-C may be Group-A, and server-1 would copy only fields 25 having the Group-A code in field 26 of service advertisements. Continuing with the example, service-D and service-E may be Group-B, and server-2 would copy only Group-B advertisements. Another Group-C may be service-B and service-M, and server-3 would copy Group-C. Or, a server may copy more than one group. Each server 11 would thus copy and store in its service directory only those service fields 25 having a group code 26 within its predefined sphere of interest or availability. This method would somewhat reduce the local storage needed, but would add complexity to the users of the network since the group codes would have to be continuously updated as the types and classes of users and service providers were altered.

According to the invention, in order to avoid the necessity for storing at each server 11 a service directory of all of services available at each of the service providers, or of adding the complexity of group codes, an improved protocol is employed. Referring to the flow chart of FIG. 3, this protocol is implemented by a server 11, and begins at block 28 when a user terminal 12 makes a request of a server 11 that results in the server recognizing the need of a given type of service. The server 11 immediately, without referencing a local service directory, sends out a multi-cast request as indicated by block 29 of the flow chart. This multi-cast request message is of the form shown in FIG. 4, and comprises a header 30 containing a multi-cast address field 31 directed to all of the host nodes 14 (service providers) on the network. The header 30 of the request message also includes a field 32 identifying the server 11, and a message type field 33 specifying that this is a service request. The body of the message includes a field 34 naming the service requested, and any other constraints such as bandwidth needed and time periods applicable.

Figure 4:
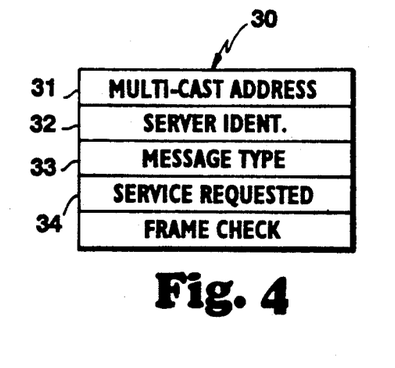
FIG. 4 is a diagram of one embodiment of a message format for a service request which may be used in the system of FIG. 1, according to a protocol of FIG. 3 of one embodiment of the invention.
Figure 5:
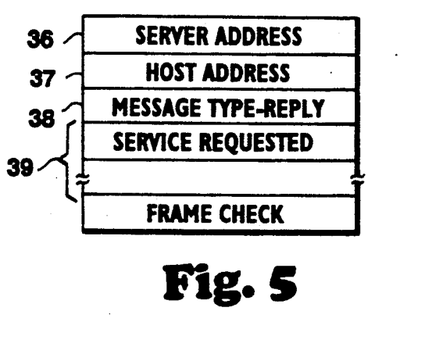
FIG. 5 is a diagram of one embodiment of a message format for a reply to the message of FIG. 4, according to a protocol of one embodiment of the invention.

Following receipt by the host nodes 14 of the service request of FIG. 4, the first node 14 having the service available as requested sends a response of the type illustrated in FIG. 5, indicating to the requesting server 11 that the service is immediately available. This message identifies the requesting server 11 in an address field 36 in the header, and identifies the answering host node 14 in an address field 37. A message type field 38 identifies this as a service provider reply, and the body 39 of the message may repeat the type of service available and the rating or specified conditions.

Figure 6:
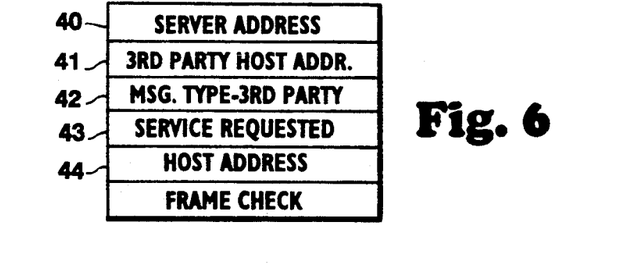
FIG. 6 is a diagram of one embodiment of a message format for a third party reply to the message of FIG. 4, according to a protocol of one alternative embodiment of the invention.

Optionally, according to one embodiment, a third party may reply to the multi-cast request of FIG. 4. One of the other host nodes 14 may be configured to collect service advertisement messages of FIG. 2 and to maintain a service directory as referred to above. This host node 14 can send a reply message as seen in FIG. 6 to the requesting server 11. As in FIG. 5, the requesting server is identified in a field 40 of the message of FIG. 6, and the replying (third party) host identified in a field 41. The message type in field 42 identifies this as a third party reply. The body of the message repeats the requested service in a field 43, and identifies in a field 44 the address of the host node 14 which the third party has specified as being able to provide the requested service. The reason a third party host node 14 would be able to reply when the service provider itself would not, is that the service provider may be in the process of sending a block of data to another node and would merely queue the request message of FIG. 4 rather than reply. By allowing a third party reply, an immediate response is available to the server 11 which sent the service request, so it can proceed to initiate the service transaction.

Figure 3:
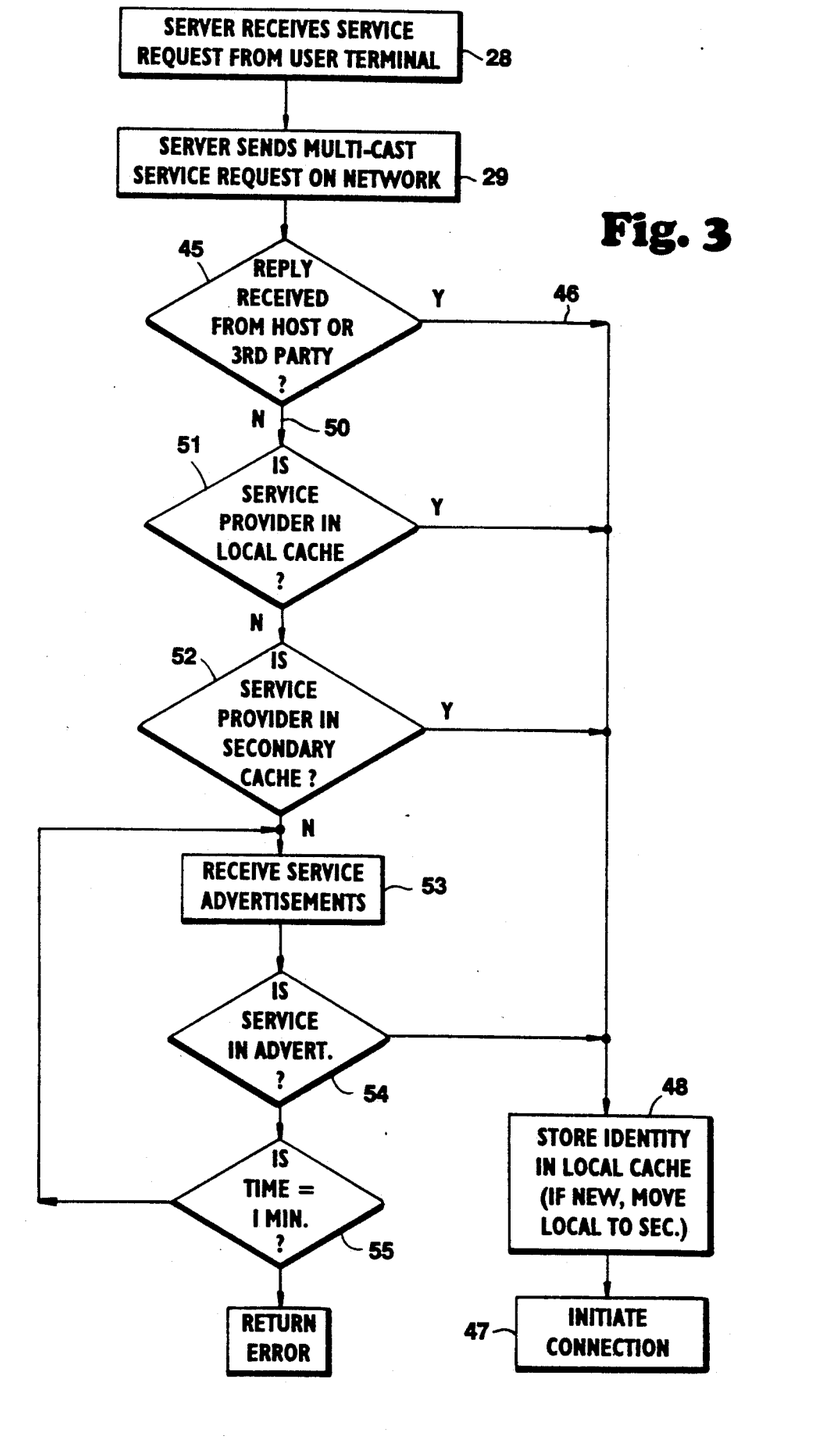
FIG. 3 is a logic flow chart of a method of operating a server in the system of FIG. 1 to implement the protocol according to an embodiment of the invention.

Referring to FIG. 3, the server 11 which requested the service waits for a reply message of FIG. 5 or FIG. 6 for a specified time, depending upon the network configuration, and decision point 45 indicates that if a reply is received the control flow proceeds by a path 46 toward completing the connection as indicated by the block 47. Depending upon the particular protocol and the hardware of the network, the steps of completing the connection may include establishing a virtual circuit, or may be merely starting to send data to the identified host node 14; usually messages would be exchanged before data is sent. First, however, the identity of the host node 14 as a provider for this particular service is stored in a local cache as indicated in the block 48 of the flow chart.

Figure 7:
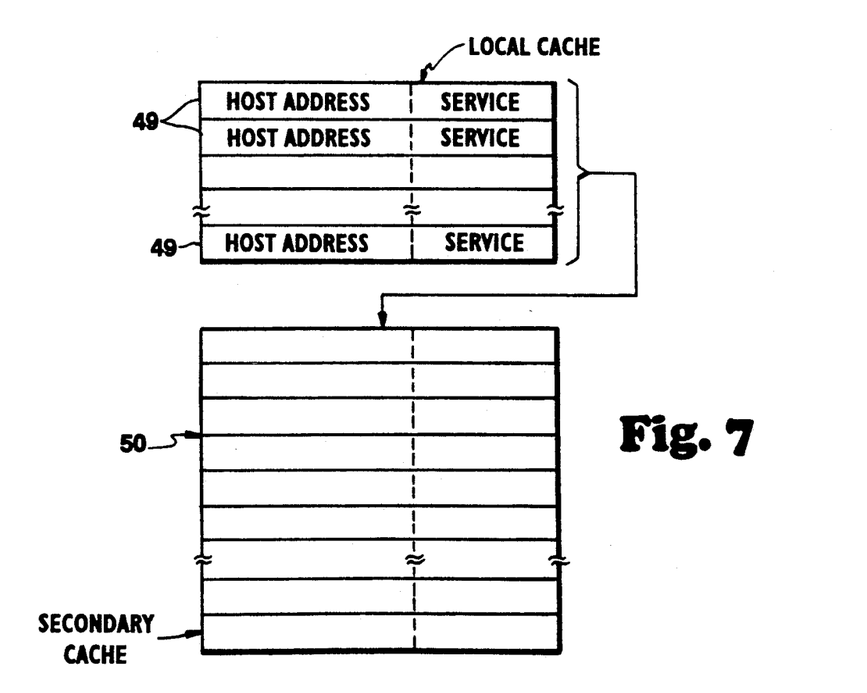
FIG. 7 is a block diagram of a local cache used in implementing the protocol of FIG. 3.

The local cache is a data structure as shown in FIG. 7 maintained in the memory of a server 11 and comprising a number of locations 49, one for each user terminal 12 connected to this server 11. These locations 49, one for each terminal 12, comprise a primary cache, and a secondary cache 50 is also provided, functioning as a push-down stack. Each location 49, or each storage location in the secondary cache, includes a field storing the address of a host node 14 and a field identifying a service provided by this host node. The most recently used service for each user terminal 12 at a given server 11 will be saved in the primary cache location 49 reserved for this terminal, and as other services are used by the terminals their primary cache locations 49 will be pushed to the stack 50. Thus the identity of the last service used by a terminal will always be immediately available, and the identity of other services recently used by any of the users at a server are saved and pushed down on the stack until discarded as storage space is used up. The number of locations in stack 50 available for storage will depend upon the memory facility implemented for the server 11; this number may be only a few, or may be hundreds, and may dynamically change as memory is needed for other operations. Typically, about 1K-byte of memory is dedicated to this local cache function. In any event, the identity of the providers of the most recently used services for each terminal are available in the local cache at each server, and also the identity for a number of services recently used by the server.

Referring again to FIG. 3, if a reply message is not received at the decision point 45, control flows by path 50 to a step of searching the local cache 49 of FIG. 7 to determine if the requested service is the most recently used service by the requesting terminal. First the primary cache 49 of the requesting terminal is checked, as indicated by the decision point 51, and if present then control flows by the path 46 to the step of initiating a connection by sending a message directly to the identified service provider host node 14 (block 47). If not present in the primary cache 49 then the secondary cache 50 is checked, as indicated by a decision point 52, representing a test of whether the requested service is found in a search of the secondary cache 50; if "yes" then again control flows by path 46 to the connection complete block 47. In either case (via "yes" at decision points 51 or 52) the identity of the service provider is stored in the primary cache 49, and if this is a new value then the previous value from cache 49 is stored to the top of the stack 50 of FIG. 7, indicated by block 48 as before.

If the identity of a provider for the requested service is not found in the local cache, or secondary cache, the control passes to a loop beginning with block 53 of FIG. 3 which represents a step of receiving service advertisement messages of FIG. 2. As indicated by decision point 54, the server checks to see if the requested service is present in an advertisement, and if it does the control passes to path 46 and the server stores the identity of the service provider to the local cache 49 as indicated by block 48 and a connection is made as indicated by block 47. For example, the server 11 may wait for approximately one minute for the desired service advertisement to appear on the network, as indicated by the decision point 55. After one minute, if no advertisement of the requested service appears, a "not available" indication is returned to the requesting terminal.

Figure 8:
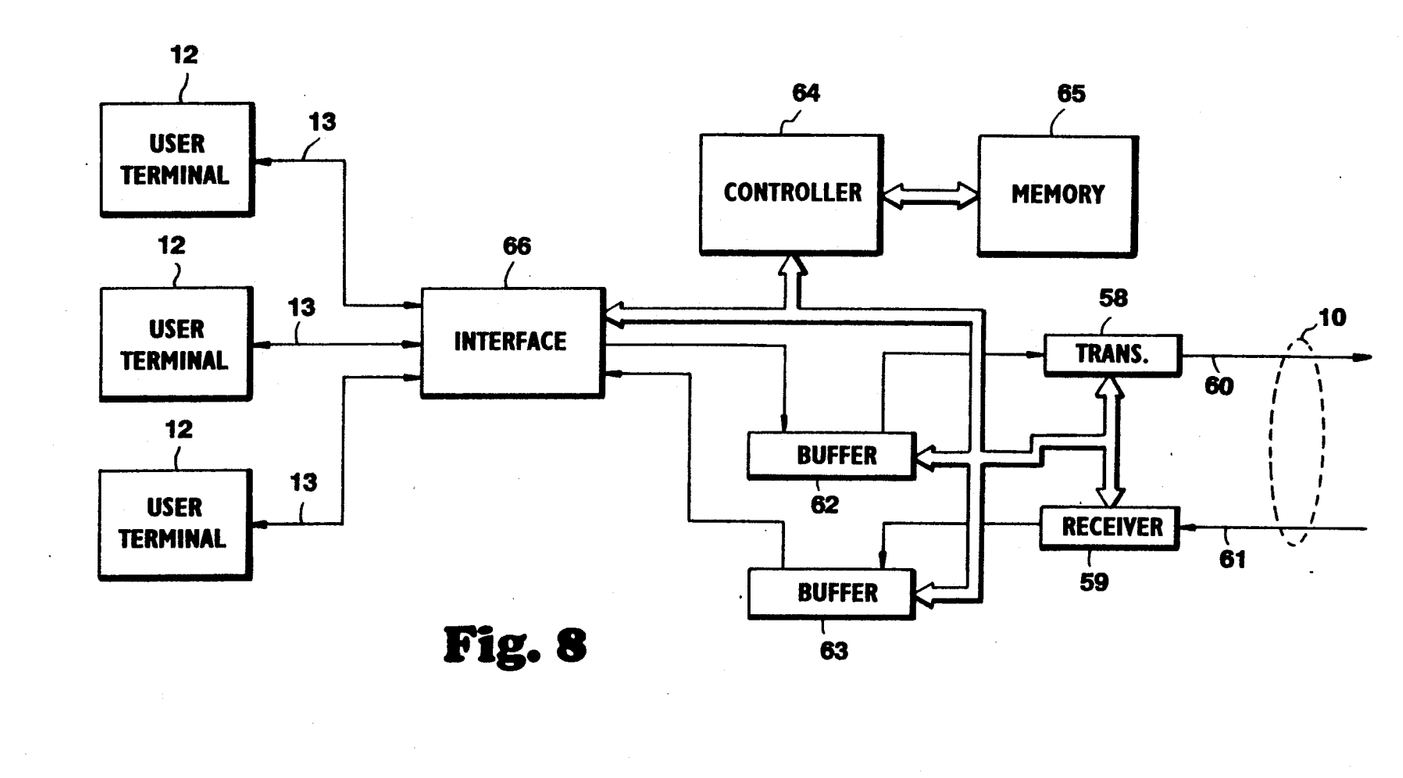
FIG. 8 is an electrical diagram in block form of one of the servers in the system of FIG. 1, in an example of equipment for implementing the method of the invention.

Referring to FIG. 8, the construction of a server 11, as an example, would include a transmitter 58 and a receiver 59 connected to the transmit and receive lines or channels 60 and 61 of the communications link 10. Transmit and receive buffer memory units 62 and 63 hold the transmit and receive data stream before and after transmission, and a controller 64 accesses these buffers to make up the message packets and message stream according to the protocol being used. The controller 64 also manages the operation of the transmitter and receiver 58 and 59, and loading of the buffers 62 and 63. The controller 64 may be a microprocessor, for example, or may be hardwired logic, i.e., a sequencer or state machine. A memory 65 would be accessed by the controller 64 for program and data if the controller is of the microprocessor type, or in any event would be needed as the local cache 49 and 50 as discussed above. The controller 64 would execute the method depicted by the flow chart of FIG. 3, using hardwired logic or code stored in the memory 65. The controller 64 also manages an interface 66 to the user terminals 12. It is understood, of course, that the method of the invention may be executed at a higher level or lower level than the transport protocol of U.S. Pat. No. 4,823,122.

In an alternative embodiment, the nodes 14 on the network of FIG. 1 may be configured to always respond to requests for service provider information. That is, a message of FIG. 2 is always answered by a host or third party with a message of FIG. 4 or FIG. 5, even if the nodes are busy with other traffic. In this case, the local cache is not required, and the blocks 48, 51 and 52 are omitted from a flow chart of the method.

The advantages of the protocol according to the invention are several. First, less memory is needed in the server 11. That is, the memory 65 need not be expanded to store service advertisements for all services the user terminals may ever need. If a local cache is employed, the memory requirement for this function is minimal. Thus, the server 11 can be constructed with lower cost, smaller size, and with lower power dissipation. Secondly, group code configuration is not required. The local storage of network addresses of service providers is based upon actual usage by a server, rather than by estimated or projected usage, and so user intervention to establish group codes is unnecessary, either by managers of the host nodes 14 or managers of the servers 11. Third, all services are accessible by any server 11 implementing features of the invention, independent of assignment of group codes; some servers on a network can be implementing the protocol of U.S. Pat. No. 4,823,122 using group codes, and other servers can be using the protocol according to this invention.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a server on a communications network, said network including a plurality of nodes, comprising the steps of:
   a) sending onto said communications network by a first of said nodes a request for a service to be provided by another of said nodes on said network;
   b) waiting to receive at said first node a reply message from said another node specifying the network address of a node of said network providing said service;
   c) if said reply message is not received by said first node, waiting to receive at said first node a service advertisement message from said network, and identifying in said advertisement message the network address of a node providing the service of said service request.

2. A method according to claim 1 including the step of initiating a communications transaction between said first node and said another node after said another node has been identified, to thereby utilize said requested service.

3. A method according to claim 1 including the steps of:
   a) maintaining in said first node a cache of the identity of nodes on said network providing the most recently used services requested by said first node;
   b) before said step of waiting to receive a service advertisement message, if a reply message responding to said service request is not received, searching said cache in said first node for the identify of a node providing said requested service.

4. A method according to claim 3 wherein said first node includes a plurality of user terminals, and wherein said step of maintaining includes storing in a separate cache for each said user terminal the identity of providers of services last requested by each said user terminal.

5. A method according to claim 4 wherein said step of maintaining includes storing in a secondary cache the content of any one of said separate caches whenever a new identity is stored in any one of said separate caches.

6. A method according to claim 1 wherein said step of waiting to receive includes waiting to receive at said first node a reply message either from said another node or a third party node specifying the identity of the network address of a node of said network providing said service.

7. A method according to claim 1 wherein said request is a multi-cast message for reception by all said nodes on said network which may provide services.

8. A method of operating a device on a communications network, the network including a plurality of nodes, comprising the steps of:
   a) sending onto said communications network by a first of said nodes a request for a network address of another node on said network, said request identifying said another node by function;

b) waiting to receive at said first node a reply message from said another node, said reply message including the network address of said another node;

c) maintaining in said first node a cache of the network addresses of nodes on said network recently used by said first node for selected functions;

d) searching said cache for the network address of a node providing said function identified in said request;

e) if said reply message is not received, and said searching does not find a network address of a node identified by said function, then waiting to receive at said first node an advertisement message from said network, and identifying in said advertisement message the network address of a node providing the function identified in said request.

9. A method according to claim 8 including the step of initiating a communications transaction between said first node and the node of said network address, after said network address has been identified, to thereby implement said requested function.

10. A method according to claim 8 wherein said first node includes a plurality of user terminals, and wherein said step of maintaining includes storing in a separate cache for each said user terminal the network addresses of nodes having functions last requested by each said user terminal.

11. A method according to claim 10 wherein said step of maintaining includes storing in a secondary cache the content of any one of said separate caches whenever a new network address is stored in any one of said separate caches.

12. A method according to claim 8 wherein said first node is a server, and a plurality of users are coupled to said server for accessing said network.

13. A method according to claim 12 wherein other nodes on said network are service providers, and said functions are services provided via said other nodes.

14. A server coupled to a communications network, comprising:

a) means included in said server and connected to said network for sending onto said communications network a request for a network address of the provider of a service;

b) means for receiving at said server via said network a reply message from another node on the network specifying the network address of a provider of said service;

c) means for receiving at said server via said network, if said reply message is not received, a service advertisement message from said network, and means for identifying in said advertisement message the network address of a provider of said service.

15. A server according to claim 14 including:

a) means for maintaining in said server a cache of the network addresses of nodes on said network providing the most recently used services requested by said server; and b) means for searching said cache for the network address of a provider of said requested service, before said identifying in said service advertisement message.

16. A server according to claim 15 including means for initiating a communications transaction between said server and said network address from one of (a) said reply message, (b) said means for searching, and (c) said means for identifying, to thereby utilize said requested service.

17. A server according to claim 15 wherein said server is coupled to a plurality of user terminals, and wherein said means for maintaining includes means for storing in a separate cache for each said user terminal the network addresses of providers of services last requested by each said user terminal.

18. A server according to claim 17 wherein said means for maintaining includes means for storing in a secondary cache the content of any one of said separate caches whenever a new network address is stored in any one of said separate caches.

19. A device for coupling to a communications network, comprising:

a) means coupled to said communications network for sending onto said communications network a request for a network address of another node on said network, said request identifying said another node by function;

b) means coupled to said communications network for receiving at said device a reply message from said another node via said network, said reply message including the network address of said another node;

c) means for maintaining in said device a cache of the network addresses on said network recently used by said device for selected functions;

d) means for searching said cache for the network address of a node providing said function identified in said request, if said reply message is not received;

e) means, functioning if said reply message is not received and if said means for searching does not find a network address of a node providing said function, coupled to said communications network for receiving at said device an advertisement message fro said network, and for identifying in said advertisement message the network address of a node providing said function identified in said request.

20. A device according to claim 19 including means for initiating a communications transaction between said device and the node of said network address, after said network address has been identified, to thereby implement said requested function.

21. A device according to claim 20 wherein said device is coupled to a plurality of user terminals, and wherein said means for maintaining includes means for storing in a separate cache for each said user terminal the network addresses of nodes having functions last requested by each said user terminal.

22. A device according to claim 21 wherein said means for maintaining includes means for storing in a secondary cache the content of any one of said separate caches whenever a new network address is stored in any one of said separate caches.

23. A device according to claim 19 wherein said device is a server, and a plurality of user terminals are coupled to said server for accessing said network.

24. A device according to claim 23 wherein other nodes on said network are service providers, and said functions are services provided via said other nodes.

25. A method of operating a communications network, comprising the steps of:

a) sending from a server to all of a plurality of host nodes a request for identifying one of said host nodes to provide a service;

b) if a host node is able to provide said service, sending a reply message from said host node to said server to identify said host node;

c) if a reply message is received by said server, beginning a transaction with said host node for said service;

d) storing in a local cache in said server the identity of host nodes which have previously provided services to said server;

e) if a reply message is not received by said server, searching said local cache for the identity of a host node to provide said service, and if said identity is found, beginning a transaction with the identified host node for said service;

f) if said identity is not found upon searching said local cache, waiting to receive by said server a service advertisement sent by a host node identifying said service as available from a host node at a network address given in said service advertisement, and, when said service advertisement is received, beginning a transaction for said requested service.

26. A method according to claim 25 wherein said server is coupled to a plurality of user terminals, and wherein said step of storing includes storing in a separate cache for each said user terminal the identity of providers of services last requested by each said user terminal.

27. A method according to claim 26 wherein said step of storing includes storing in a secondary cache the content of any one of said separate caches whenever a new identity is stored in any one of said separate caches.

28. A method according to claim 25 including the step of sending from a third party host node a reply message to said server to identify a host node able to provide said service.

29. A method according to claim 25 wherein said identity of a host node is the network address of said host node.

30. A communications network comprising:
a) a communications link;
b) a plurality of servers coupled to said communications link, each server having a plurality of user terminals coupled thereto;
c) a plurality of service providers coupled to said communications network;
d) each one of said servers and each one of said service providers having means for sending and receiving messages to each of the other servers and service providers via said link;

e) means in each of said servers to send via said link a service request to all of said service providers for a service needed by a user terminal coupled to a server;

f) means in each of said service providers to send via said link a reply message to a server which sent said service request if said service provider is able to provide the requested service, said reply message identifying said service provider;

g) means in each said server to maintain a cache of the identity of service providers of most recently used services used by said server;

h) means in each said server to search said cache for said server if said reply message is not received after a server sends one of said service requests;

i) each one of said service providers periodically sending a service advertisement message to all of said servers via said link indicating what services are available to be provided and the identity of said service provider sending said service advertisement;

j) means in each said server to receive said service advertisement messages from said service providers via said link and to identify the service provider of the service of said service request, if a service provider for said requested service is not found in said cache.

31. A network according to claim 30 wherein each said server is coupled to a separate plurality of user terminals, and wherein said means for maintaining in each server includes means for storing in a separate cache for each said user terminal the identity of providers of services last requested by each said user terminal.

32. A network according to claim 31 wherein said means for storing includes means for storing in a secondary cache the content of any one of said separate caches whenever a new identity is stored in any one of said separate caches.

33. A network according to claim 30 including means for sending from a third party host node a reply message to said server to identify a host node able to provide said service.

34. A network according to claim 30 wherein said identity of a host node is the network address of said host node.

* * * * *